March 10, 1970  W. J. ROOS  3,499,201
METHOD OF MAKING A SPHERICAL BEARING ASSEMBLY
Filed March 15, 1968

INVENTOR
William J. Roos
BY
ATTORNEYS

United States Patent Office 3,499,201
Patented Mar. 10, 1970

3,499,201
METHOD OF MAKING A SPHERICAL BEARING ASSEMBLY
William J. Roos, New London, N.H., assignor to MPB Corporation, Keene, N.H., a corporation of New Hampshire
Filed Mar. 15, 1968, Ser. No. 713,443
Int. Cl. B21d 53/10; B23p 17/00
U.S. Cl. 29—149.5                6 Claims

ABSTRACT OF THE DISCLOSURE

A method of making a bearing assembly having an inner bearing member with an outer spherical bearing surface and an outer race of plastic material wherein said race is molded about a spherical shaped die having a diameter at least at large as the inner bearing member, split or fractured, and then positioned about the inner bearing member.

BACKGROUND OF THE INVENTION

Field of the invention

This invention relates to bearing assemblies and more particularly to a method of making spherical bearing assemblies in which the outer race is formed of plastic material.

Description of the prior art

In the manufacture of a spherical bearing assembly, the outer race member may be formed of hardened steel having a single fracture so that it may be spread apart to receive the inner spherical bearing member. A construction of this type is disclosed in U.S. Patent No. 3,179,477. Alternatively, the outer race may be made of plastic material molded directly about the inner bearing member. Bearing assemblies of this latter type are disclosed in U.S. Patent No. 3,287,071.

With the bearing assembly as disclosed in U.S. Patent No. 3,179,477, the outer race is turned from steel, heat-treated, ground to a finish on both the bore and the outer diameter, and then fractured for reception of the inner bearing member. The grinding of the bore of the outer race member must produce an inner spherical bearing surface precisely complementary to the outer spherical surface of the inner bearing member in order to provide a smooth running assembly. This essential requirement contributes to the overall cost of manufacture; and generally, this type of assembly is more expensive than one in which the outer race is formed of molded plastic.

In the bearing assembly of U.S. Patent No. 3,287,071, the plastic outer race is molded directly about the inner barrel-shaped member; and in accordance with the teachings of this patent, the necessary play between the inner bearing member and the outer race is produced by initially molding the outer race in unstressed line-to-line bearing engagement with the inner bearing member. In order to effect this unstressed running engagement of the outer race in its as molded condition, however, a low shrink, maximum fill plastic material is used. A bearing race formed with this material produces an accurately precisioned assembly; but such an assembly has somewhat limited application because only certain plastic materials can be used. Close fitting plastic materials may also shrink too tightly where high moisture or temperature environmental conditions cause expansion of the material. A definite need for a preselected clearance between bearing members exists for some applications, a factor which this invention satisfies.

Forming the outer race of the bearing assembly with high shrink plastic materials rather than low shrink materials may be more desirable in some cases because many of these materials have more appropriate bearing characteristics for certain applications; but the use of such materials presents problems in producing the necessary clearance between the bearing surfaces of the outer race and inner bearing member. Upon setting, high shrink plastic material shrinks tightly about the inner bearing member and this requires that separate steps be taken to produce the required clearance.

A number of procedures have been developed for providing this clearance but none have proved completely satisfactory. As described in U.S. Patent No. 3,287,071, the clearance may be produced by using a temporary parting compound during the molding operation, deflecting the inner bearing member axially within the plastic race after the plastic has set to deform the plastic, or by rotating the inner bearing member eccentrically within the forming mold during the molding of the race. Providing the necessary clearance by axially deflecting the inner bearing member tends to deform the plastic race making it difficult to obtain an accurate control of the clearance; and the same is true where the clearance is formed by rotating the bearing eccentrically during the production of the outer race member. Also, where the bearing assembly is provided with an outer housing member surrounding the outer race, shrinkage of the plastic material will cause the race to separate from the housing.

In addition to the limitations and deficiencies of the plastic bearing assemblies as described above, such assemblies do not lend themselves to molding a plastic race about a plastic inner bearing member since the heat generated in the molding operation will tend to cause a fusing of the outer race to the inner bearing member.

SUMMARY OF THE INVENTION

In accordance with the teachings of the present invention, there is provided a bearing assembly having a split or fractured outer plastic race member manufactured in such a way whereby a wide range of plastic materials, including high shrink materials, may be used with assurance of obtaining a controlled precision clearance or radial play between the bearing surfaces of the race and the inner bearing member. In addition, the manufacturing of the assembly of the present invention is simpler than prior procedures and also less expensive. The assembly may include a plastic inner bearing member if desired; and is readily adapted for use in rod ends or as spherical bearings for assembly into more complex housings.

Generally, in manufacturing the bearing assembly in accordance with the teachings of the present invention, the outer plastic race is first molded about a die member having a spherical outer surface with a diameter equal to or slightly larger than the diameter of the inner bearing member with which the outer race is to be assembled. After the plastic material forming the outer race has set and hardened, it is fractured by simply moving the die member in an axial direction relative to the outer race. This creates a distortive force on the outer race as the larger diameter portion of the die member is forced out one end of the race to cause the fracturing. The race thus formed has an inner bearing surface of precise known diameter and is readily assembled with the inner bearing member by spreading it apart at the fracture. In a bearing assembly constructed in this manner, the inner bearing member will have a known radial clearance relative to the inner bearing surface of the outer race member; and by choosing inner bearing members of different diameters, this clearance may be varied with precision.

DESCRIPTION OF THE PREFERRED EMBODIMENT

Figure 1:
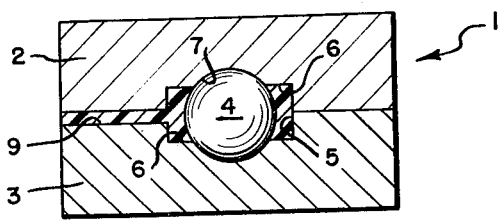
FIG. 1 is a cross-sectional side view of the forming mold used to mold the outer race of the assembly.
Figure 2:
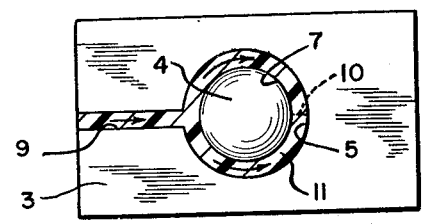
FIG. 2 is a cross-sectional view of the forming mold.
Figure 3:
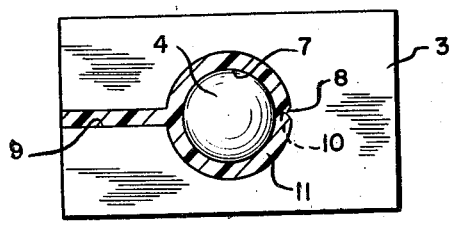
FIG. 3 is a cross-sectional view similar to FIG. 2 of a modified embodiment of the forming mold.

As shown in FIGS. 1 and 2, the plastic outer race of the assembly is molded in a forming mold generally designated at 1. The mold includes upper and lower halves 2 and 3, respectively, and an inner die member 4 which is spherical in shape. As shown in FIG. 1, the inner die member is a solid ball. Alternatively, the inner die member may be barrel-shaped like the inner bearing member which is to be assembled with the outer race. With the inner die member positioned within the forming mold, a molding cavity is formed. This molding cavity has an outer wall 5, opposed side walls 6 and an inner wall 7, the inner wall being defined by a portion of the outer spherical surface of the die member 4. As indicated in FIG. 3, the outer wall of the cavity may be provided with a projecting rib 8 for producing a groove in the periphery of the outer race which is molded within the cavity. The projecting rib extends from one side wall 6 of the cavity to the other; and when included will produce a definite weakened point on the outer periphery of the formed race. Alternatively, the projecting rib may be provided on the die member 4 to form a groove on the interior of the outer race being molded or may be provided on one or both of the halves of the mold to form a groove on the adjacent side surface of the outer race.

In forming the outer race, a suitable thermoplastic or thermosetting plastic material is injected into the cavity through an injection orifice 9. Examples of suitable materials are nylon, acetal resin and polytetrafluoroethylene. Upon injection of the plastic material, it is directed in two oppositely moving flows, indicated by the arrows in FIG. 2, around the outer spherical surface of the die member. The injected plastic material is in a liquefied state and the molding pressure and temperature are controlled so that the two flows meet on the diametrically opposite side of the cavity from the location of the injection orifice. As the two flows come together, they produce an internally fused surface designated at 10 in FIG. 2; and this surface defines an inherent weak spot in the formed race 11. In order to produce a more definite weakened point, the molding form having a rib such as shown in FIG. 3 may be used. Such a forming mold is also suitable for use where the outer race is to be molded of plastic materials having physical properties which form a structure of uniform density and no weakened internally fused surface.

In manufacturing the outer race member in the manner described above, its bearing surface is formed precisely in accordance with the spherical configuration of the die member 4. Since the diameter of the die member is known, the diameter of the inner bearing surface of the outer race member 11 is also known. Accordingly, by choosing die members of different diameters, outer races with inner bearing surfaces of desired diameters may be readily produced with precision and under reproducible conditions.

Figure 4:
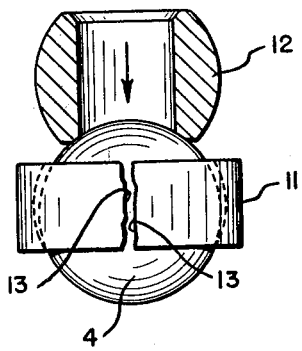
FIG. 4 is a side view of the molded outer race showing the fracturing thereof as the inner die member is removed.
Figure 6:
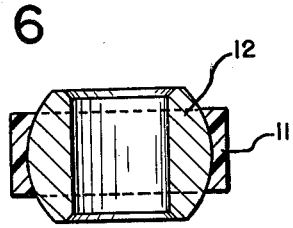
FIG. 6 is a cross-sectional view of the bearing assembly taken along line 6—6 of FIG. 5.
Figure 5:
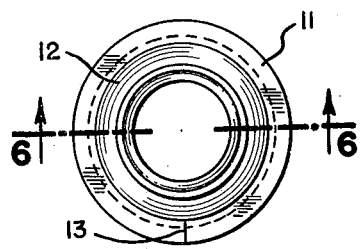
FIG. 5 is a top plan view of the bearing assembly.

After the plastic material has been allowed to set, the die member 4 is removed from the outer race member 11 by moving it axially thereof as shown in FIG. 4. Advantageously this movement of the die member is effected by using the inner bearing member 12 which ultimately will be used in the bearing assembly. As the die member passes out one axial end of the outer race member, the surface of the die at its diameter produces a distortive force acting in a direction radially outwardly of the outer race and this causes the outer race to fracture at the weakened point defined by the surface 10 or at the groove if a forming mold such as shown in FIG. 3 is used. Following the exit of the die member from the outer race member, the inner bearing member moves directly into the outer race member and when properly seated permits the fracture to close with the broken ends 13 in abutting engagement as shown in FIG. 5.

By choosing an inner bearing member having a known diameter either equal to or smaller than the known diameter of the die member, the desired radial play between the bearing surfaces of the inner bearing member and the outer race member is accurately provided; and as indicated above, the amount of radial play may be readily varied by simply using inner bearing members having different diameters. With the assembly constructed as described above, the radial play between the inner bearing member and the outer race member is not only controllable, but the bearing surface of the outer race member will be precisely complementary to the outer bearing surface of the inner bearing member and this result is effected without producing undesirable deformation of the outer race or other undesirable physical changes in the race. In addition, the manufacture of the bearing assembly as described above permits the use of inner bearing members themselves constructed of plastic materials which if attempted to be used with an outer race which is molded in place, would fuse to the race and produce an unworkable assembly. The bearing assembly constructed in accordance with the teachings of the present invention can be mounted in various housings or mounting arrangements as a spherical bearing or it can be pressed into a rod end housing or other suitable housing and staked, bonded or otherwise secured in place.

The above description of the present invention has been made with reference to the presently preferred embodiment and its method of manufacture; however, it is to be understood that various changes may be made thereto without departing from the scope of the invention as set forth in the following claims.

What I claim is:

1. The method of manufacturing an outer race of plastic material for positioning about an inner bearing member having an outer spherical bearing surface of predetermined diameter to form a bearing assembly comprising the steps of:
   (a) placing a die member having a spherical outer surface of known diameter at least as great as that of said inner bearing member into a forming mold to define a cavity having an outer wall, opposed side walls and an inner wall defined by at least a portion of the outer spherical surface of said die member;
   (b) filling said cavity with a liquefied plastic material which when set is subject to fracturing upon the application of a distortive force thereto;
   (c) allowing said plastic material to set to form said outer race having an inner spherical wall surface of the same shape as the outer spherical surface of said die member, an outer wall surface corresponding in shape to that of the outer wall of said cavity and side wall surfaces corresponding in shape to that of the side walls of said cavity; and
   (d) removing said die member from said outer race by moving it axially of said outer race to thereby produce said distortive force causing fracturing of said outer race along a line extending from one side to the other at one point about its periphery.

2. The method of manufacturing a bearing assembly having an inner bearing member with an outer spherical bearing surface of predetermined diameter and an outer race of plastic material comprising the steps of:
   (a) placing a die member having a spherical outer surface of known diameter at least as great as that of said inner bearing member into a forming mold to define a molding cavity having an outer wall, opposed side walls and an inner wall defined by at least a portion of the outer spherical surface of said die member;

(b) filling said cavity with a liquefied plastic material which when set is subject to fracturing upon the application of a distortive force thereto;

(c) allowing said plastic material to set to form said outer race having an inner spherical wall surface of the same shape as the outer spherical surface of said die member, an outer wall surface corresponding in shape to that of the outer wall of said cavity and side wall surfaces corresponding in shape to that of the side walls of said cavity;

(d) removing said die member from said outer race by moving it axially of said outer race to thereby produce said distortive force causing fracturing of said outer race along a line extending from one side to the other at one point about its periphery; and (e) positioning said inner bearing member within said outer race in bearing engagement with the inner spherical wall surface thereof.

3. The method of manufacturing a bearing assembly as set forth in claim 2 wherein:

(a) said cavity is formed with a projecting rib in its outer wall extending from one side wall of the cavity to the other to produce a groove in the outer periphery of said outer race extending from one side thereof to the other, said groove defining a weakened point on said outer race; and (b) said fracturing is effected at said weakened point.

4. The method of manufacturing a bearing assembly as set forth in claim 3 wherein:

(a) said liquefied plastic material is injected into said cavity and directed in two oppositely moving flows around the spherical surface of said die member at a temperature and pressure causing the two flows to come together and produce an internal fused surface extending from one side of the outer race to the other when said plastic material has set, said surface defining a weakened point on said outer race; and (b) said fracturing is effected at said weakened point.

5. The method of manufacturing a bearing assembly as set forth in claim 4 wherein:

(a) said cavity is filled with liquefied high shrink plastic material; and (b) said plastic material is allowed to set and shrink tightly about the outer spherical surface of said die member.

6. The method of manufacturing a bearing assembly as set forth in claim 5 wherein:

(a) said die member is removed from said outer race by pushing against it with said inner bearing member as said inner bearing member is being positioned within said outer race.

References Cited

UNITED STATES PATENTS 3,174,811   3/1965   Schmidt et al.

THOMAS H. EAGER, Primary Examiner

U.S. Cl. X.R.

29—413, 527.6; 308—72